US010104602B2

(12) United States Patent
Popiel et al.

(10) Patent No.: US 10,104,602 B2
(45) Date of Patent: Oct. 16, 2018

(54) COORDINATION OF CELLULAR DATA THROUGH A SELECTED CELLULAR DEVICE

(71) Applicant: GM Global Technology Operations LLC, Detroit, MI (US)

(72) Inventors: Luke J. Popiel, Rochester, MI (US); Anthony J. Sumcad, Troy, MI (US); Lakshmi V. Thanayankizil, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 44 days.

(21) Appl. No.: 15/289,451

(22) Filed: Oct. 10, 2016

(65) Prior Publication Data

US 2018/0103423 A1   Apr. 12, 2018

(51) Int. Cl.
*H04W 48/18* (2009.01)
*H04W 76/15* (2018.01)
*H04B 1/3822* (2015.01)
*H04W 76/02* (2009.01)
*H04W 88/10* (2009.01)

(52) U.S. Cl.
CPC .......... *H04W 48/18* (2013.01); *H04B 1/3822* (2013.01); *H04W 76/025* (2013.01); *H04W 76/15* (2018.02); *H04W 88/10* (2013.01)

(58) Field of Classification Search
CPC ..... H04W 48/06; H04W 48/08; H04W 48/16; H04W 48/17; H04W 76/02; H04W 48/00; H04W 48/18; H04W 76/025; H04W 88/10; H04W 76/15; H04B 1/00; H04B 17/309; H04B 7/15; H04B 1/3822

USPC ................................................ 455/405, 41.1
See application file for complete search history.

(56) References Cited

U.S. PATENT DOCUMENTS

| 9,783,162 B2 * | 10/2017 | Hoyos | B60R 25/25 |
| 2011/0092237 A1 * | 4/2011 | Kato | H04W 64/003 455/507 |
| 2013/0078945 A1 * | 3/2013 | Lavi | H04W 84/22 455/410 |

(Continued)

FOREIGN PATENT DOCUMENTS

CN    203675335 U    6/2014

*Primary Examiner* — Khawar Iqbal
(74) *Attorney, Agent, or Firm* — David Willoughby; Reising Ethington P.C.

(57) ABSTRACT

A system and method for coordinating wireless cellular communications for a plurality of cellular devices at a wireless coordination device. The method comprises establishing a data connection between the wireless coordination device and the plurality of cellular devices, wherein the cellular devices are configured to connect to at least one cellular network via wireless cellular communications; determining whether each cellular device is currently connected to a cellular network; determining at least one performance metric for each of the plurality of cellular devices that are currently connected to a cellular network; evaluating the performance metric(s) for each of the plurality of cellular devices; selecting one of the plurality of cellular devices based at least in part on one or more the evaluations; and configuring each of the plurality of cellular devices to carry out wireless cellular communications through the selected cellular device.

17 Claims, 2 Drawing Sheets

(56) References Cited

U.S. PATENT DOCUMENTS

| | | | |
|---|---|---|---|
| 2013/0107736 A1* | 5/2013 | Yamada | H04W 48/18 370/252 |
| 2014/0293829 A1* | 10/2014 | Visuri | H04L 12/145 370/254 |
| 2016/0013818 A1* | 1/2016 | Smith | H04B 7/155 455/11.1 |
| 2016/0037568 A1* | 2/2016 | Hakola | H04W 76/14 370/329 |
| 2016/0212721 A1* | 7/2016 | Sheng | H04W 76/14 |
| 2016/0227518 A1* | 8/2016 | Li | H04W 72/042 |
| 2016/0285540 A1* | 9/2016 | Bhargava | H04W 48/20 |
| 2017/0027009 A1* | 1/2017 | Dumpala | H04W 76/023 |
| 2017/0041845 A1* | 2/2017 | Ta | H04W 36/14 |
| 2017/0317740 A1* | 11/2017 | Basu Mallick | H04B 7/15557 |
| 2018/0035391 A1* | 2/2018 | Neves | H04W 16/00 |

\* cited by examiner

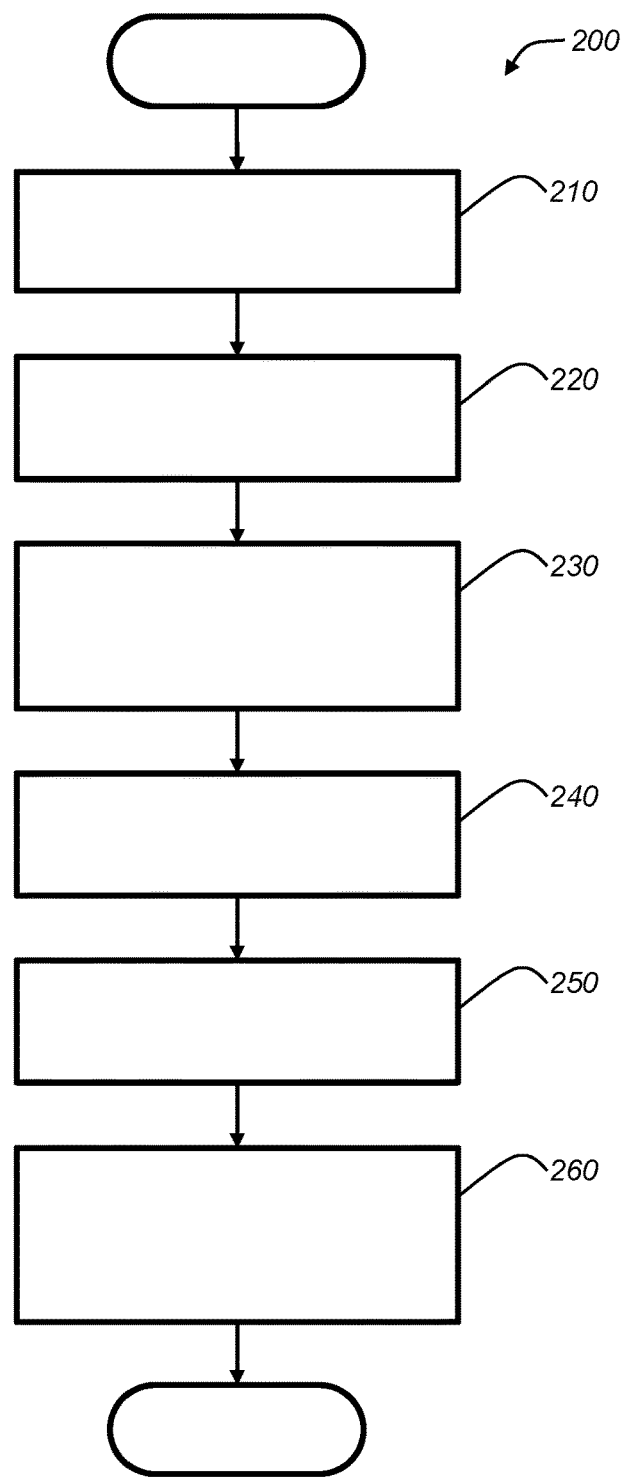

COORDINATION OF CELLULAR DATA THROUGH A SELECTED CELLULAR DEVICE

TECHNICAL FIELD

The disclosure relates to coordination of cellular data from a plurality of cellular devices through a selected cellular device.

BACKGROUND

Many electronic devices now carry out network communications. For example, many cellular devices transmit voice and data communications over both a short-range wireless network, such as Wi-Fi™, and a cellular network, such as GPRS or CDMA. Now, numerous individuals may own or use multiple different cellular devices, each of which may operate over a different cellular plan. And different cellular plans may vary in data rates, bandwidth, costs, and/or other attributes. Moreover, some cellular plans include restrictions on the amount of data that may be downloaded/uploaded from a cellular device.

SUMMARY

According to an embodiment of the invention, there is provided a method of coordinating wireless communications for a plurality of cellular devices at a wireless coordination device, wherein the method comprises: establishing a data connection between the wireless coordination device and the plurality of cellular devices, wherein the cellular devices are configured to connect to at least one cellular network via wireless cellular communications; determining at least one performance metric for each of the plurality of cellular devices that are currently connected to a cellular network; evaluating the performance metric(s) for each of the plurality of cellular devices; selecting one of the plurality of cellular devices based at least in part on one or more of the evaluations; and configuring each of the plurality of cellular devices to carry out wireless cellular communications through the selected cellular device.

According to another embodiment of the invention, there is provided a method of coordinating wireless communications for a plurality of cellular devices at a wireless device, wherein the method comprises: establishing a data connection between a wireless coordination device and the plurality of cellular devices; determining, for each of the cellular devices, at least one performance metric relating to the cellular communication capabilities of the cellular device; determining a current connectivity status for each of the cellular devices; evaluating, for each of the cellular devices, the performance metric(s) and the current connectivity status; selecting one of the plurality of cellular devices based on the results of the evaluations; and directing wireless cellular communications carried out by the plurality of cellular devices through the selected cellular device using the wireless coordination device.

BRIEF DESCRIPTION OF THE DRAWINGS

Exemplary embodiments will hereinafter be described in conjunction with the appended drawings, wherein like designations denote like elements, and wherein:

FIG. 2 is a flowchart illustrating a method of coordinating wireless communications for a plurality of cellular devices at a wireless device.

DETAILED DESCRIPTION

Figure 1:
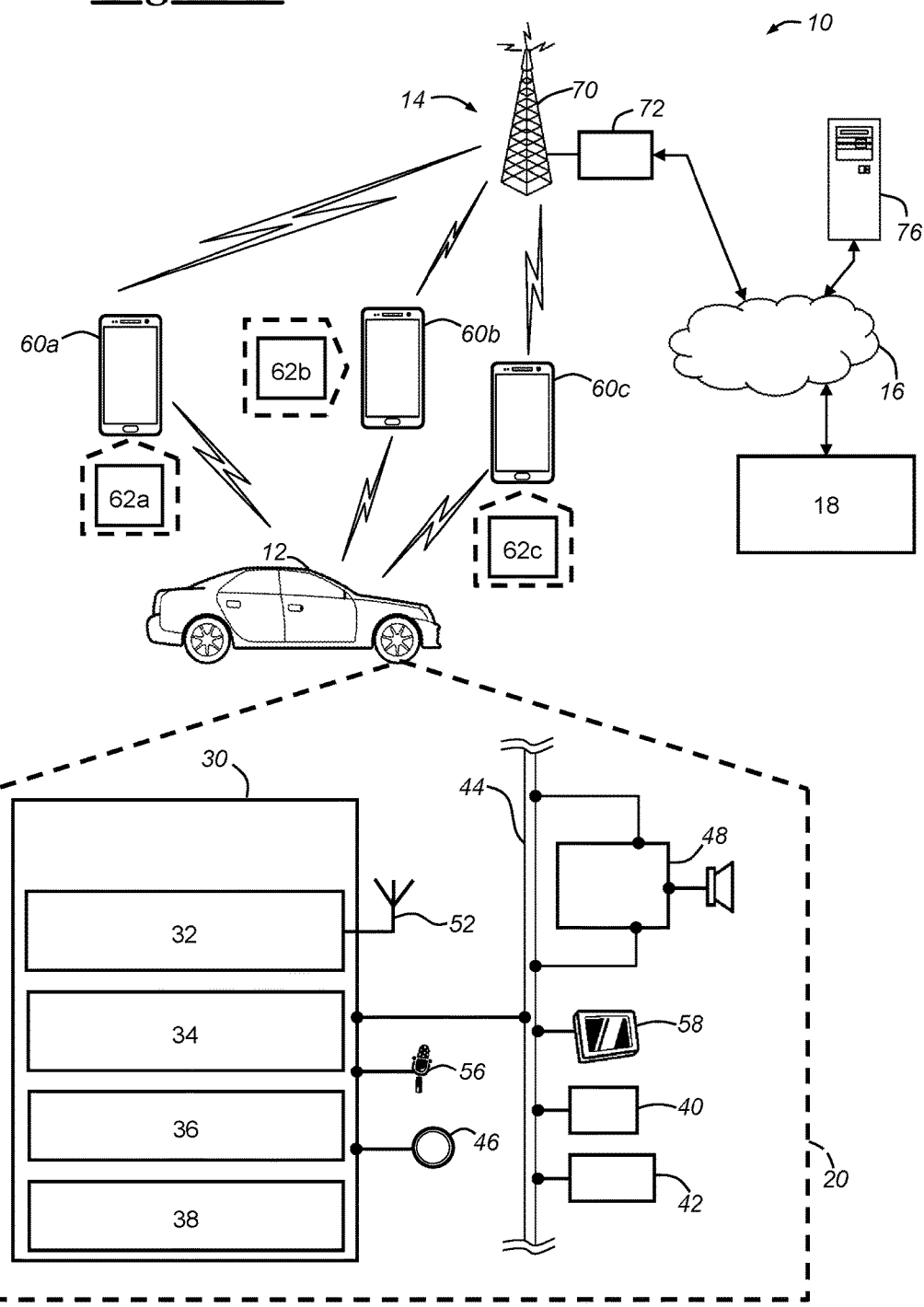
FIG. 1 is a block diagram depicting an embodiment of a communications system that is capable of utilizing the method disclosed herein.

The system and methods described below enable a wireless coordination device to coordinate data communications for a plurality of cellular devices through one of the plurality of cellular devices. In one embodiment, the method enables a plurality of cellular devices to carry out their cellular data communications via a selected cellular device. Thus, in one scenario, it may be desirable to coordinate all cellular communications of the cellular devices through a single selected device that offers desirable attributes, such as low costs, high bitrate or bandwidth, high connection strength, or unrestricted amounts of data transfer. In another scenario, one or more of the cellular devices may not have a cellular connection and, as a result of at least one embodiment of the method provided herein, their data and/or voice communications may be channeled through a selected cellular device which does have a cellular connection. As will be described in more detail below, the selection of a cellular device with which to carry out cellular data communications for the other devices may be based on a variety of performance metrics, such as the amount of data the cellular plan allots to a given cellular device per a given time period, a preferred device as selected by an operator, and the present connection strength of a device's cellular signal.

The system generally includes a wireless coordination device and a plurality of cellular devices. In some embodiments, the wireless coordination device is included as part of vehicle electronic equipment in a vehicle and includes a wireless access point. In other embodiments, the wireless coordination device may be a handheld cellular device, such as a smartphone or tablet. The method generally includes the steps of establishing a data connection between the wireless coordination device and each of the plurality of cellular devices; determining at least one performance metric for each of the plurality of cellular devices; evaluating the performance metric(s); selecting one of the plurality of cellular devices based on the evaluation; and configuring each of the plurality of cellular devices to carry out their respective wireless cellular communications through the selected cellular device.

Referring now to FIG. 1, there is shown an operating environment that comprises a communications system 10 and that can be used to implement the method disclosed herein. Communications system 10 generally includes a vehicle 12, a wireless coordination device 30, one or more wireless carrier systems 14, a land communications network 16, a remote facility 18, a computer 76, and a plurality of cellular devices 60. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 14 is preferably a cellular telephone system that includes a plurality of cell towers 70 (only one shown), one or more mobile switching centers (MSCs) 72, as well as any other networking components required to connect wireless carrier system 14 with land network 16. Each cell tower 70 includes sending and receiving antennas and a base station, with the base stations from different cell towers being connected to the MSC 72 either directly or via intermediary equipment such as a base station controller. Cellular system 14 can implement any suitable communications technology, including for example, analog technologies such as AMPS, or the newer digital technologies such as CDMA (e.g., CDMA2000) or GSM/GPRS. As will be appreciated by those skilled in the art, various cell tower/base station/MSC arrangements are possible and could be used with wireless system 14. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 14, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite 62, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 14.

Land network 16 may be a conventional land-based telecommunications network that is connected to one or more landline telephones and connects wireless carrier system 14 to remote server cluster 14. For example, land network 16 may include a public switched telephone network (PSTN) such as that used to provide hardwired telephony, packet-switched data communications, and the Internet infrastructure. One or more segments of land network 16 could be implemented through the use of a standard wired network, a fiber or other optical network, a cable network, power lines, other wireless networks such as wireless local area networks (WLANs), or networks providing broadband wireless access (BWA), or any combination thereof.

Computers 76 (only one shown) can represent computers accessible via a private or public network such as the Internet. Each computer 76 can be used for one or more purposes, such as a web server accessible by the plurality of cellular devices 60. Other such accessible computers 76 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 12, remote facility 18, or both. A computer 76 can also be used for providing Internet connectivity such as DNS services or as a network address server that uses DHCP or other suitable protocol to assign an IP address to the vehicle 12.

Wireless coordination device 30 is a device capable of short range wireless communications and capable of carrying out the method herein. Wireless coordination device 30 may be a hardware component that includes a cellular chipset and optionally provides a wireless access point. In many embodiments, the wireless coordination device may be a vehicle module that is configured to carry out the method disclosed herein. For example, the wireless coordination device 30 can be an infotainment unit or head unit that includes a wireless access point 32 using a processor 34, memory 36, and cellular chipset 38. The device 30 may be a vehicle system module (VSM) and can be implemented as an OEM-installed (embedded) or aftermarket device that is installed in the vehicle. In another embodiment, the wireless coordination device is merely a wireless access point and a processor that is configured to carry out the method disclosed herein. In other embodiments, the wireless coordination device may comprise a plurality of devices, such as a telematics unit that includes a cellular chipset and a head unit that includes a wireless access point. In yet another embodiment, the wireless coordination device is one of the plurality of cellular devices that includes a wireless access point, such as a Wi-Fi™ access point or Bluetooth™ access point.

The wireless coordination device 30 may coordinate the cellular communications of a plurality of cellular devices 60. In one embodiment, the device 30 may communicate with a plurality of cellular devices via one or more short-range wireless communication (SRWC) protocols or via a wired connection. Generally, wireless coordination device 30 includes a wireless access point 32 for short-range wireless communications using a wireless modem for data transmission, an electronic processing device 34, one or more digital memory devices 36, cellular chipset 38, and an antenna 52. In other embodiments, coordination device 30 may not include a wireless access point and, in such an embodiment, the one or more of cellular devices 60 may communicate with device 30 via a wired connection, such as a USB connection.

Wireless coordination device 30 can be configured to communicate wirelessly according to one or more wireless protocols, including short range wireless communication (SRWC) such as any of the IEEE 802.11 protocols, WiMAX™, ZigBee™, Wi-Fi™ direct, Bluetooth™, or near field communication (NFC). When used for packet-switched data communication such as TCP/IP, the coordination device 30 can be configured with a static IP address or can be set up to automatically receive an assigned IP address from another device on the network such as a router or from a network address server. In one embodiment, the device 30 may be configured to use wireless access point 32 and antenna 52 to connect to a plurality of cellular devices.

The coordination device 30 may also include a cellular chipset 38 that enables it to carry out cellular communications with wireless carrier system 14. In such an embodiment, the coordination device uses radio transmissions to establish a communications channel, such as a voice channel and/or a data channel, with wireless carrier system 14 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art. In one embodiment, the wireless coordination device is a central cellular device, such as a mobile cellular telephone. In such an embodiment, the central cell device may also be the selected cellular device which is used to carry out all the cellular communications for the cellular devices. In another embodiment, the central cellular device may be a vehicle system module, such as a head unit, infotainment unit, or telematics unit.

According to one embodiment, device 30 utilizes cellular communication according to GSM, CDMA, or LTE standards and thus includes a standard cellular chipset for voice communications like hands-free calling. It should be appreciated that the modem can either be implemented through software that is stored in the coordination device 30 and is executed by processor 34, or it can be a separate hardware component located internal or external to coordination device 30. The modem can operate using any number of different standards or protocols such as LTE, EVDO, CDMA, GPRS, and EDGE.

Processor 34 can be any type of device capable of processing electronic instructions including microprocessors, microcontrollers, host processors, controllers, vehicle communication processors, and application specific integrated circuits (ASICs). It can be a dedicated processor used only for coordination device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below with respect to FIG. 2. This application may communicate with applications 62, which are included in cellular devices 60.

GPS module 40 receives radio signals from a constellation of GPS satellites. From these signals, the module 40 can determine vehicle position that is used for providing navigation and other position-related services to the vehicle driver. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 40), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 18 or other remote computer system, such as computer 76, for other purposes, such as fleet management. Also, new or updated map data can be downloaded to the GPS module 40 from the remote facility 18 via a vehicle telematics unit.

Apart from the coordination device 30, audio system 48, and GPS module 40, the vehicle 12 can include other vehicle system modules (VSMs) 42 in the form of electronic hardware components that are located throughout the vehicle and typically receive input from one or more sensors and use the sensed input to perform diagnostic, monitoring, control, reporting, and/or other functions. Each of the VSMs 42 is preferably connected by communications bus 44 to the other VSMs, as well as to the wireless coordination device 30, and can be programmed to run vehicle system and subsystem diagnostic tests. As examples, one VSM 42 can be an engine control module (ECM) that controls various aspects of engine operation such as fuel ignition and ignition timing, another VSM 42 can be a powertrain control module that regulates operation of one or more components of the vehicle powertrain, and another VSM 42 can be a body control module that governs various electrical components located throughout the vehicle, like the vehicle's power door locks and headlights. According to one embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 12, as numerous others are also possible.

Vehicle electronics 20 also includes a number of vehicle user interfaces that provide vehicle occupants with a means of providing and/or receiving information, including microphone 56, pushbutton(s) 46, audio system 48, and visual display 58. As used herein, the term 'vehicle user interface' broadly includes any suitable form of electronic device, including both hardware and software components, which is located on the vehicle and enables a vehicle user to communicate with or through a component of the vehicle. Microphone 56 provides audio input to the wireless coordination device 30 to enable the driver or other occupant to provide voice commands and carry out hands-free calling via the wireless carrier system 14. For this purpose, it can be connected to an on-board automated voice processing unit utilizing human-machine interface (HMI) technology known in the art. The pushbutton(s) 46 allow manual user input into the coordination device 30 to initiate wireless telephone calls and provide other data, response, or control input. Separate pushbuttons can be used for initiating emergency calls versus regular service assistance calls to the remote facility 18.

Audio system 48 provides audio output to a vehicle occupant and can be a dedicated, stand-alone system or part of the primary vehicle audio system. According to the particular embodiment shown here, audio system 48 is operatively coupled to both vehicle bus 44 and an entertainment bus (not shown) and can provide AM, FM and satellite radio, CD, DVD and other multimedia functionality. This functionality can be provided in conjunction with or independent of the infotainment module described above. Visual display 58 is preferably a graphics display, such as a touchscreen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Cellular devices 60 are devices that are capable of cellular communications via use of cellular carrier system 14. The cellular devices may include: hardware, software, and/or firmware enabling cellular telecommunications and/or short-range wireless communication (SRWC), as well as other wireless device functions and applications. The hardware of each cellular device 60*a-c* comprises a processor and memory for storing the software, firmware, and/or other computing instructions. This memory may include volatile RAM or other temporary powered memory, as well as a non-transitory computer-readable medium that stores some or all of the software needed to carry out the various external device functions discussed herein. The cellular devices may also include a cellular chipset that enables cellular communications via cellular carrier system 14.

The cellular devices may each include a processor and software stored in the memory that enable various software applications, which may be preinstalled or installed by the user (or manufacturer). This may include an application 62 that can allow a vehicle user to communicate with other cellular devices and/or vehicle 12, namely with the wireless coordination device 30. In the illustrated embodiment, cellular devices 60*a-c* are handheld wireless devices; in particular, smartphones having cellular telephone capabilities as well as SRWC capability using an IEEE 802.11 protocol and/or a Bluetooth™ protocol such as Bluetooth™ Low Energy (BLE). In other embodiments, any one of devices 60 may be a tablet, laptop computer, or any other suitable device having the same or similar wireless communication capability. Additionally, cellular devices 60 may be vehicle modules, such as any of those shown in FIG. 1, or any other VSM that may carry out its own cellular communications, such as a telematics unit (not shown). In one embodiment, wireless coordination device 30 may include a cellular chipset and may be a cellular device. In any event, using one or more of these wireless communication technologies, applications 62 enable the user to wirelessly connect cellular devices 60 with vehicle 12 or other cellular devices.

Applications 62 may be software that is installed on each of the cellular devices and which enables the device to operate in accordance with the method provided for herein. The applications may be used in providing performance metrics to the wireless coordination device 30 for use in its determination of which cellular device should be selected to carry out the cellular communications for the plurality of devices. Applications 62 may be preinstalled by the OEM or may be installed by an operator of the device. For example, applications 62 may be downloaded via an application store, such as iTunes™, Google Play™, or the Windows Store™. In another example, the application may be downloaded directly from a URL. Additionally, the application 62 or another application may allow for other functionality related to the vehicle but not necessarily to the method described herein, such as controlling certain functionality of the vehicle. The application may also be used to enable the user of device 60 to view information pertaining to the vehicle, such as the current location of the vehicle, whether the vehicle is locked or unlocked, and/or information pertaining to an account associated with the user or vehicle.

With reference to FIG. 2, there is shown an embodiment of a method 200 of coordinating wireless communications for a plurality of cellular devices at a wireless coordination device. The method begins with step 210 wherein the wireless coordination device 30 establishes a data connection between the wireless coordination device and the plurality of cellular devices. In one embodiment, the coordination device 30 uses wireless access point 32 to establish a wireless connection to cellular devices 60 via an IEEE 802.11 protocol, such as IEEE 802.11b/g/n. In another embodiment, the coordination device 30 establishes a data connection with one or more of the cellular devices 60 via a wired connection. In such an embodiment, the cellular devices may be communicatively coupled to the vehicle electronics 20 via a USB connection. In yet another embodiment, the wireless coordination device 30 may establish connections with the one or more cellular devices via multiple different protocols and/or means, such as through using both wired and wireless connections. Thus, the devices 60 then are able to carry out communications with the wireless coordination device 30. The method 200 proceeds to step 220.

In step 220, the coordination device 30 determines whether each cellular device is currently connected to a cellular network. In one embodiment, the coordination device 30 determines the cellular connection status of each of the cellular devices 60 via querying each of the cellular devices as to their current connectivity status. A current connectivity status of a cellular device may include whether the cellular device presently has cellular service and, if so, may additionally include the signal strength of the cellular device. The query and response may be communicated over the established data connection, as illustrated above in step 210. The method 200 proceeds to step 230.

In step 230, the coordination device determines at least one performance metric for each of a plurality of cellular devices. As used herein, a performance metric for a cellular device is any metric, attribute, property, condition, and/or other characteristic of the cellular device, a cellular connection of the cellular device, and/or a cellular usage plan associated with the cellular device. For example, a performance metric of a cellular device could be the current bit-rate, bandwidth, or strength of the cellular device's present cellular connection. In another example, the amount of data that the cellular device's cellular usage plan allots or allocates to the device may be a performance metric. In yet another example, a performance metric of a cellular device is the hardware and/or software characteristics of the cellular device's cellular chipset. A performance metric may also be whether the cellular device was preset by a user as a "preferred cellular device," as explained in more detail below.

In one embodiment of step 230, the wireless coordination device 30 determines one or more performance metrics of each of the cellular devices 60*a-c* via communications that are carried out over the established data connection (step 210). The applications 62*a-c* on each of the cellular devices 60*a-c* may be configured to determine one or more performance metrics of their host cellular device. For example, application 62*b* may obtain the present bandwidth of a cellular connection that cellular device 60*b* has established with a cell tower 70. Then, application 62*b* sends the bandwidth reading to coordination device 30 via the data connection that was established in step 210. These performance metrics may then be stored in memory 36.

In another embodiment of step 230, an operator of vehicle 12 may enter information pertaining to one or more performance characteristics of one or more of cellular devices 60 into vehicle 12. The operator may set performance metrics of one or more of the cellular devices, such as the data plan for the cellular devices. Additionally, an operator may define one or more "preferred cellular devices." Such preferred cellular devices may be those devices that an operator desires to be used for all of the cellular devices' communications. A user may use any number of vehicle user interfaces to carry out such configurations or presets, such as touchscreen 58, microphone 56, and/or pushbutton 46. Wireless coordination device 30 may then receive this inputted information from the modules via bus 44 or directly, such as would be the case with microphone 56 and/or pushbutton 46. Device 30 may then store this information in memory 36. It should be appreciated that this step and/or certain parts of this step may be carried out before, after, or at the same time as steps 210 and 220.

In some embodiments, a priority system can be used wherein a predetermined set of performance metrics are used to determine which device should be selected. For example, the wireless coordination device could determine which data networks are within a close range of the vehicle, the amount of data each cellular device has available, the highest throughput and/or lowest signal deterioration for each of the cellular devices, the expiration date of each cellular device's associated data plan, and/or the most cost-effective associated data network among the plurality of cellular devices. An application 62 may be used in conjunction with coordination device 30 and/or other vehicle system modules to compile this information. This information may be stored in memory 36.

In yet another embodiment of step 230, the vehicle may recall previously stored information from a memory device included therein, such as memory 36. The recalled information may be one or more performance metrics associated with one or more devices or may be information that is useful for deriving such performance metrics. It should be appreciated that not all performance metrics need to be derived from the same or analogous sources; for example, device 60*a* may use application 62*a* to determine a bandwidth of the device while information may be recalled by the wireless coordination device 30 to determine a bandwidth of devices 60*b* and 60*c*. The method then continues to step 240.

In step 240, the wireless coordination device 30 evaluates the performance metric(s) for each of the plurality of cellular devices. In one embodiment, the evaluations may comprise of comparing the performance metrics of each of the cellular devices 60 to determine which device has a performance metric that is higher than metrics of other devices or higher than a predetermined threshold. In another embodiment, the evaluations may comprise a multi-factored weighing algorithm that weighs certain performance metrics to determine which cellular device has the overall most desirable cellular connection for which to use for the cellular data communications of the cellular devices. The method 200 proceeds to step 250.

In step 250, the wireless coordination device selects one of the plurality of cellular devices based at least in part on one or more the evaluations. The selection may be made using the processor 34. The selection may be made through choosing the cellular device which has the most desirable cellular connection according to the results of the evaluations of step 240. For example, if cellular device 60*c* has 15 GB of data remaining that may be communicated via cellular communications, whereas device 60*a* and 60*b* each only have 5 GB of data remaining that may be communicated via cellular communications, then the coordination device 30 may select device 60*c*. In another example, if cellular device 60*a* has a download speed of 19.05 Mbps (megabits per second), cellular device 60*b* has a download speed of 18.22 Mbps, and cellular device 60*c* has a download speed of 18.72 Mbps, then device 60*a* would be selected. In yet another example, the selection may be made based on the results of both evaluations and/or other information, such as whether a preferred device was preset by a vehicle operator or passenger via microphone 56, pushbutton 46, and/or touchscreen 58. After a selection is made, the selection may be saved to memory 36. The method 200 proceeds to step 260.

In step 260, the wireless coordination device configures each of the plurality of cellular devices to carry out their respective wireless cellular communications through the selected cellular device. The coordination device 30 communicates with the cellular devices 60 via sending messages to and receiving messages from applications 62. In one embodiment, the coordination device 30 may inform only the selected device via sending a message to the selected device's application 62. Then, the coordination device may act as an access point for the non-selected cellular devices and the coordination device may then direct or forward all data and/or other requests from the non-selected cellular devices through the selected cellular device.

For example, the wireless coordination device 30 may receive request data from the non-selected cellular devices and then may forward this data to the selected cellular device. Additionally, the wireless coordination device 30 may receive a plurality of response data from the selected cellular device, wherein the response data was previously received by the selected cellular device from a remote server. In this example, the remote server may be any server, computer, or device accessible via the Internet or other interconnected network. Then, after receipt of the response data, the selected cellular device or the wireless coordination device 30 may determine which of the plurality of cellular devices 60 each of the response data corresponds to and, subsequently, forward the response data to the corresponding cellular devices 60.

In another embodiment, the coordination device 30 may send configuration data to the cellular devices 60 informing the devices to connect to the selected cellular device 60. The configuration data may indicate which of the plurality of cellular devices was selected in the selecting step and/or other information relating to the selected device or the wireless coordination device. Thereafter, the non-selected cellular devices may then establish a connection with the selected cellular device. Next, the non-selected cellular devices may then direct their data communications to the selected device which will then carry out the data communication via the selected device's cellular connection. The selected device may use an application 62 to perform one or more of these steps. When a response is received at the selected device, the selected device may then route the response to the appropriate cellular device. The selected device may do so via the application 62 and/or may do so via use of a routing table. The routing table would save all data requests received from the cellular devices and, when a response is received at the selected cellular, the selected cellular will then query the routing table to determine the appropriate recipient of the response.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A method of coordinating wireless communications for a plurality of cellular devices at a wireless coordination device, wherein the method is carried out by the wireless coordination device that is installed in a vehicle, wherein the wireless coordination device includes a wireless access point, wherein the method comprises:

(a) establishing a data connection between the wireless coordination device and each of the plurality of cellular devices, wherein the cellular devices are configured to connect to at least one cellular network via wireless cellular communications, and wherein each of the data connections is established via wireless communications between the wireless access point of the wireless coordination device and a different one of the plurality of cellular devices;

(b) determining at least one performance metric for each of the plurality of cellular devices that are currently connected to a cellular network;

(c) evaluating the performance metric(s) for each of the plurality of cellular devices that are currently connected to a cellular network;

(d) selecting one of the plurality of cellular devices based at least in part on one or more of the evaluations; and (e) after step (d), configuring each non-selected cellular device to carry out wireless cellular communications through the selected cellular device, wherein the configuration of each of the non-selected cellular devices includes either or both of: (i) wirelessly sending configuration data from the wireless coordination device to the non-selected cellular device, wherein the configuration data causes the non-selected cellular device to establish a direct connection with the selected cellular device thereby enabling the non-selected cellular device to communicate data using the wireless cellular communications of the selected cellular device and the direct connection with the selected cellular device; or (ii) using the wireless coordination device to relay information between the selected cellular device and the non-selected cellular device thereby enabling the non-selected cellular device to communicate data using the wireless cellular communications of the selected cellular device and the data connection established with the wireless coordination device.

2. The method of claim 1, further comprising the step of determining whether each cellular device is currently connected to a cellular network and, subsequently, carrying out step (d) based on cellular network connectivity.

3. The method of claim 1, wherein the at least one performance metric for each of the plurality of cellular devices includes a selection indicating the cellular device is preset by an operator of the vehicle as a preferred cellular device.

4. The method of claim 3, wherein the selected cellular device is one of the plurality of cellular devices that was preset by an operator of the vehicle as a preferred cellular device.

5. The method of claim 1, wherein the configuration data indicates which of the plurality of cellular devices was selected in the selecting step.

6. The method of claim 5, wherein, in response to receipt of the configuration data, each of the non-selected cellular devices establishes a wireless connection with the selected cellular device.

7. The method of claim 1, further comprising the steps of:

(f) receiving request data at the wireless coordination device from one or more of the non-selected cellular device(s) and forwarding the request data to the selected cellular device;

(g) receiving a plurality of response data at the wireless coordination device from the selected cellular device, wherein the response data was previously received by the selected cellular device from a remote server;

(h) determining which of the one or more non-selected cellular device(s) each of the response data corresponds to; and (i) forwarding the response data to the corresponding non-selected cellular device(s).

8. The method of claim 7, wherein a routing table stored in a memory of the wireless coordination device is used in the determination(s) of which of the one or more non-selected cellular device(s) each of the response data corresponds to.

9. A method of coordinating wireless communications for a plurality of cellular devices at a wireless coordination device, wherein the method comprises:

(a) establishing a data connection between the wireless coordination device and the plurality of cellular devices;

(b) determining, for each of the cellular devices, at least one performance metric relating to the cellular communication capabilities of the cellular device;

(c) determining a current connectivity status for each of the cellular devices;

(d) evaluating, for each of the cellular devices, the performance metric(s) and the current connectivity status;

(e) selecting one of the plurality of cellular devices based on the results of the evaluations;

(f) after step (e), directing wireless cellular communications carried out by the plurality of cellular devices through the selected cellular device;

(g) after step (e), receiving request data at the wireless coordination device from one or more non-selected cellular device(s) and forwarding the request data to the selected cellular device, wherein the one or more non-selected cellular device(s) include at least one non-selected cellular device that is separate from the wireless coordination device;

(h) receiving a plurality of response data at the wireless coordination device from the selected cellular device, wherein the response data was previously received by the selected cellular device from a remote server;

(i) determining which of the one or more non-selected cellular devices each of the response data corresponds to; and (j) forwarding the response data to the corresponding non-selected cellular devices.

10. The method of claim 9, wherein the wireless coordination device is one of the plurality of cellular devices.

11. The method of claim 9, wherein the wireless coordination device is a mobile handheld cellular device.

12. The method of claim 9, wherein the wireless coordination device is a vehicle system module that is included in the vehicle and that includes a cellular chipset.

13. The method of claim 9, wherein the wireless coordination device includes a wireless access point and the data connection is established via wireless communications between the wireless access point of the wireless coordination device and the plurality of cellular devices.

14. The method of claim 9, wherein the current connectivity status for each of the cellular devices includes whether the cellular device presently has cellular service and, if so, the signal strength of the cellular device.

15. The method of claim 9, wherein the selected cellular device is the wireless coordination device.

16. The method of claim 9, further comprising the step of determining, for each of the plurality of cellular devices, whether the cellular device is a preferred device.

17. The method of claim 9, wherein the evaluating step further evaluates, for each of the cellular devices, whether the cellular device is a preferred device.

* * * * *